US006615059B1

(12) United States Patent
Pehrsson et al.

(10) Patent No.: US 6,615,059 B1
(45) Date of Patent: Sep. 2, 2003

(54) MOBILE TERMINAL INTERFACE

(75) Inventors: Claes Göran Pehrsson, Malmö (SE); Johan Georg Michael Uggmark, Lund (SE); Heino Jean Wendelrup, Malmö (SE); Ola Martin Sallenhag, Lund (SE); Lars Engelin, Södra Sandby (SE); Johan Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/487,240

(22) Filed: Jan. 20, 2000

Related U.S. Application Data

(60) Provisional application No. 60/117,502, filed on Jan. 27, 1999.

(51) Int. Cl.[7] .............................. H04B 1/38; H04M 1/00
(52) U.S. Cl. ..................... 455/569; 455/90; 455/552; 455/553; 455/557
(58) Field of Search .......................... 455/90, 552, 553, 455/556, 557, 575, 568, 569

(56) References Cited

U.S. PATENT DOCUMENTS

| | | | | |
|---|---|---|---|---|
| 4,972,470 | A | | 11/1990 | Farago ..................... 713/192 |
| 5,479,479 | A | | 12/1995 | Braitberg et al. ........... 455/557 |
| 5,625,673 | A | * | 4/1997 | Grewe et al. ............... 455/556 |
| 5,794,163 | A | | 8/1998 | Paterson et al. ............ 455/568 |
| 5,797,089 | A | * | 8/1998 | Nguyen ..................... 455/553 |
| 6,029,072 | A | * | 2/2000 | Barber ...................... 455/557 |

FOREIGN PATENT DOCUMENTS

| | | |
|---|---|---|
| WO | WO96/21988 | 7/1996 |
| WO | WO97/33384 | 9/1997 |
| WO | WO99/03294 | 1/1999 |

\* cited by examiner

*Primary Examiner*—Quochien Vuong
(74) *Attorney, Agent, or Firm*—Burns, Doane, Swecker & Mathis, L.L.P.

(57) ABSTRACT

A microphone is provided in a mobile terminal and is connected to a current source when the flip portion of the mobile terminal is open and is disconnected from the current source when the flip portion of the phone is closed. The mobile terminal can then infer the position of the flip portion of the housing, e.g., opened or closed, based upon the state of the microphone's current supply circuit, for example by detecting the current flowing through the circuit or a voltage drop across a supply resistor. In addition, an on-hook/off-hook button can be provided to a hands-free accessory without increasing a number of signal lines/connections between the hands-free accessory and the mobile terminal. This can be accomplished, for example, by connecting the on-hook/off-hook button to a switch in the microphone signal line. The switch selectively creates an open in the microphone signal line, which can be detected by the mobile terminal, thereby resulting in an off-hook condition. In addition, an interface between a mobile terminal and other auxiliary or accessory devices can be generalized to accommodate either digital or analog signaling without an increase in the number of pins/signal lines associated with the interface.

10 Claims, 4 Drawing Sheets

MOBILE TERMINAL INTERFACE

CROSS-REFERENCE TO PRIOR APPLICATION

This application claims priority from U.S. Provisional Application Ser. No. 60/117,502 filed on Jan. 27, 1999, the disclosure of which is incorporated here by reference.

BACKGROUND

The present invention relates generally to mobile terminals usable in radiocommunication systems and, more particularly, to interfaces between mobile terminals and auxiliary devices and features.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Mobile terminals, sometimes more commonly referred to as mobile phones, are also changing to suit subscriber demand and support an increasing array of services and features. For example, some consumer groups have found "flip" phones to be desirable, i.e., those mobile terminals wherein a portion of the housing can rotate between open and closed positions. Hands-free sets are also quite popular, which devices permit users to communicate wirelessly using their mobile terminals while also keeping their hands free for other tasks. As additional auxiliary devices or features become available, terminal designers must be able to interface those devices with the mobile phone, both mechanically and, at least in some cases, electrically. This poses various challenges.

For example, in the case of the flip phone, it may be desirable for the terminal's processor to know when the flip portion of the housing is open, so that other functions associated with the terminal, e.g., the display's backlighting, can be selectively actuated and the terminal can be otherwise activated without any other action required on the part of the user. Similarly, for users employing hands-free sets, it may be desirable to provide these users with a mechanism to enable them to activate the phone, e.g., to receive a call, without having to press a button on the terminal itself, which terminal may be disposed in an inconvenient pocket of the user.

To provide these, and other features, to mobile terminals typically requires some type of signaling between the auxiliary device and the terminal of the processor. To accommodate this signaling, preferably without adding complexity or cost to the mobile terminal, is a further object of the present invention.

SUMMARY

These, and other, challenges are addressed by exemplary embodiments of the present invention. According to a first exemplary embodiment, a microphone provided in a mobile terminal is connected to a current source when the flip portion of the mobile terminal is open and is disconnected from the current source when the flip portion of the phone is closed. The mobile terminal can then infer the position of the flip portion of the housing, e.g., opened or closed, based upon the state of the microphone's current supply circuit, for example by detecting the current flowing through the circuit or a voltage drop across a supply resistor.

According to a second exemplary embodiment of the present invention, an on-hook/off-hook button can be provided to a hands-free accessory without increasing a number of signal lines/connections between the hands-free accessory and the mobile terminal. This can be accomplished, for example, by connecting the on-hook/off-hook button to a switch in the microphone signal line. In one embodiment, the switch selectively creates an open in the microphone signal line, which can be detected by the mobile terminal, thereby resulting in an off-hook condition. In another embodiment, the switch selectively shorts the microphone signal line, which short can be detected by the mobile terminal to thereby result in an off-hook condition.

According to yet another exemplary embodiment of the present invention, an interface between a mobile terminal and other auxiliary or accessory devices can be generalized to accommodate either digital or analog signaling without an increase in the number of pins/signal lines associated with the interface.

BRIEF DESCRIPTION OF THE DRAWINGS

These and other objects, features and advantages of the present invention will become more apparent upon reading from the following detailed description, taken in conjunction with the accompanying drawings, wherein.

DETAILED DESCRIPTION

The present invention now will be described more fully hereinafter with reference to the accompanying drawings, in which an exemplary embodiment of the invention is shown. This invention may, however, be embodied in many different forms and should not be construed as limited to the embodiments set forth herein; rather, this embodiment is provided so that this disclosure will be thorough and complete, and will fully convey the scope of the invention to those skilled in this art.

Figure 1:
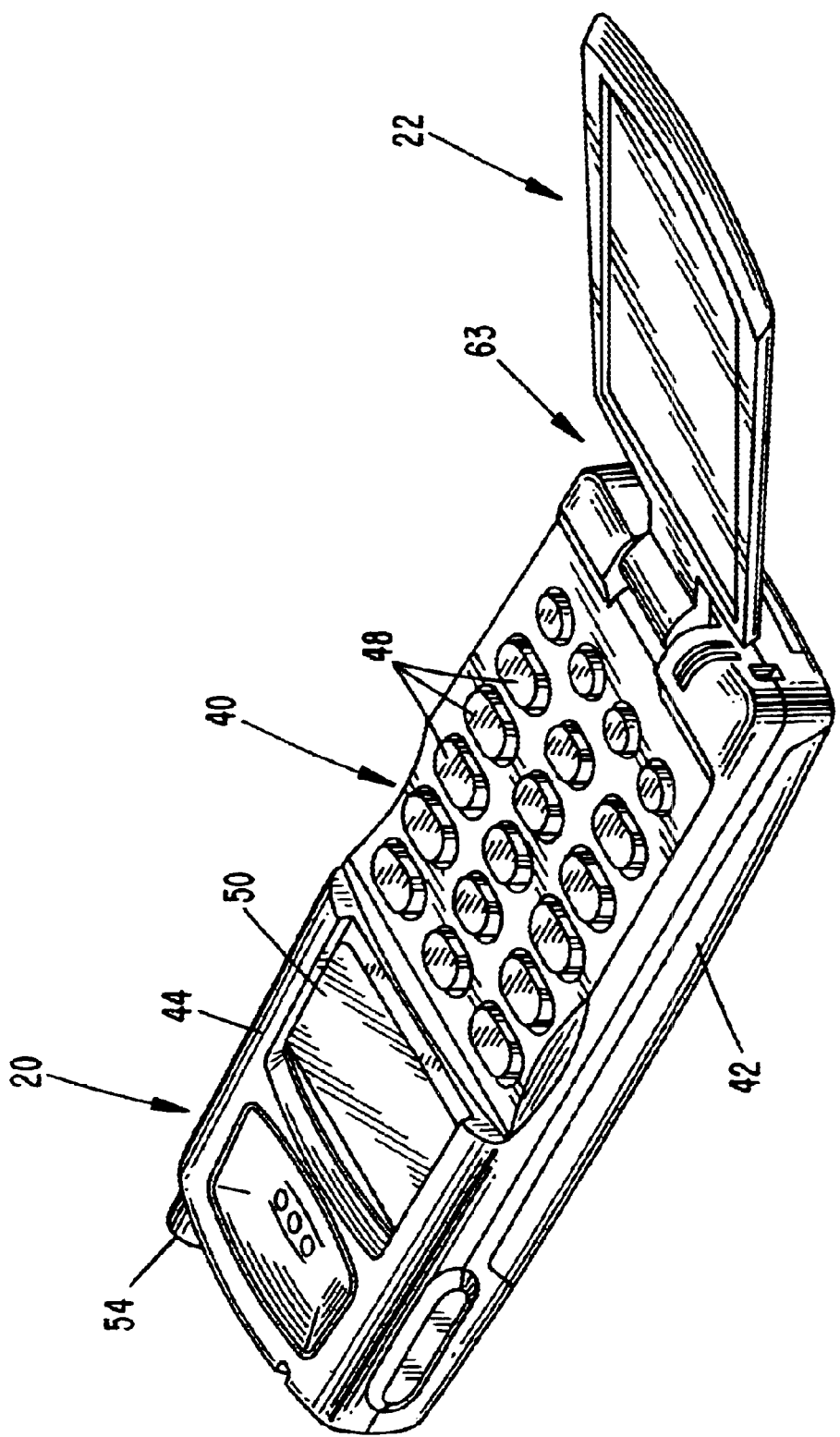
FIG. 1 illustrates an exemplary mobile terminal including a flip housing portion in which various exemplary embodiments of the present invention may be employed.

Referring now to the drawings, a radiotelephone, designated broadly at 20, is shown in FIG. 1. The mobile terminal 20 comprises a handset unit 40 and a flip cover 22. The handset unit 40 is housed within a top housing 44 and a bottom housing 42 connected thereto to form a cavity therein. The flip cover 22 is pivotally interconnected with one end of the top housing 44 via a hinge 63.

The bottom and top housing 42, 44 enclose electronic components that enable the mobile terminal 20 to transmit and receive telecommunication signals. A typical arrangement of these electronic components is shown schematically in FIG. 2. An antenna 54 (also visible in FIG. 1) for receiving telecommunication signals is electrically connected to a radio-frequency transceiver 60 that is further electrically connected to a controller 58, such as a microprocessor. The controller 58 is then electrically connected to a speaker 52 that transmits a remote signal from the controller 58 to a user of the radiotelephone 20. The controller 58 is also electrically connected to a microphone 56 that receives a voice signal from a user and transmits it through the controller 58 and the transceiver 60 to a remote device. In an exemplary embodiment of the present invention, the microphone 56 is physically disposed in the flip portion 22 of the housing. Alternatively, the microphone 56 can be physically disposed anywhere in the housing. In another exemplary embodiment of the present invention, the mobile terminal 20 is connected to a hands-free device (not shown in FIG. 1, but schematically represented in FIG. 4), which includes, for example, an earpiece, a microphone (with a suitable housing) and a cord connecting the signal lines associated with the earpiece and microphone to the mobile terminal via an interface.

The controller 58 is also electrically connected to a plurality of keypad buttons 48 and to a display window 50 that facilitate phone operation. Those skilled in the art will appreciate that radiotelephones having other electronic components are also suitable for use with the present invention.

In operation, the flip cover 22 pivots relative to the top housing 44 about the hinge 63 between a closed position and an opened position. In the closed position, the flip cover 22 overlies the top housing 44, preferably in contacting relationship. In the opened position, the flip cover 22 has "flipped" into a position in which it can assist in the acoustical transmission of the user's voice to the microphone 56 as the opposite end of the top housing 44 serves as an earpiece for the user.

As used herein, the term "activate" and derivatives thereof used in connection with the operation of the radiotelephone 20 indicate that the radiotelephone 20 has been connected with a telephone service and either can be or has been further connected with a remote telephonic service and either can be or has been further connected with a remote telephonic device, such as another telephone, a facsimile machine, or the like. In layman's terms, an "activated" telephone is one which receives a "dial tone" from a telephone service or which is connected with another telephone line. Thus, the term "activated" is intended to be synonymous with the art recognized term "off-hook". Conversely, the term "deactivate" and derivatives thereof refer to a radiotelephone 20 is not connected with another telephone line or with a telephone service transmitting a dial tone; i.e., the term is intended to be synonymous with the art-recognized term "on-hook".

Figure 2:
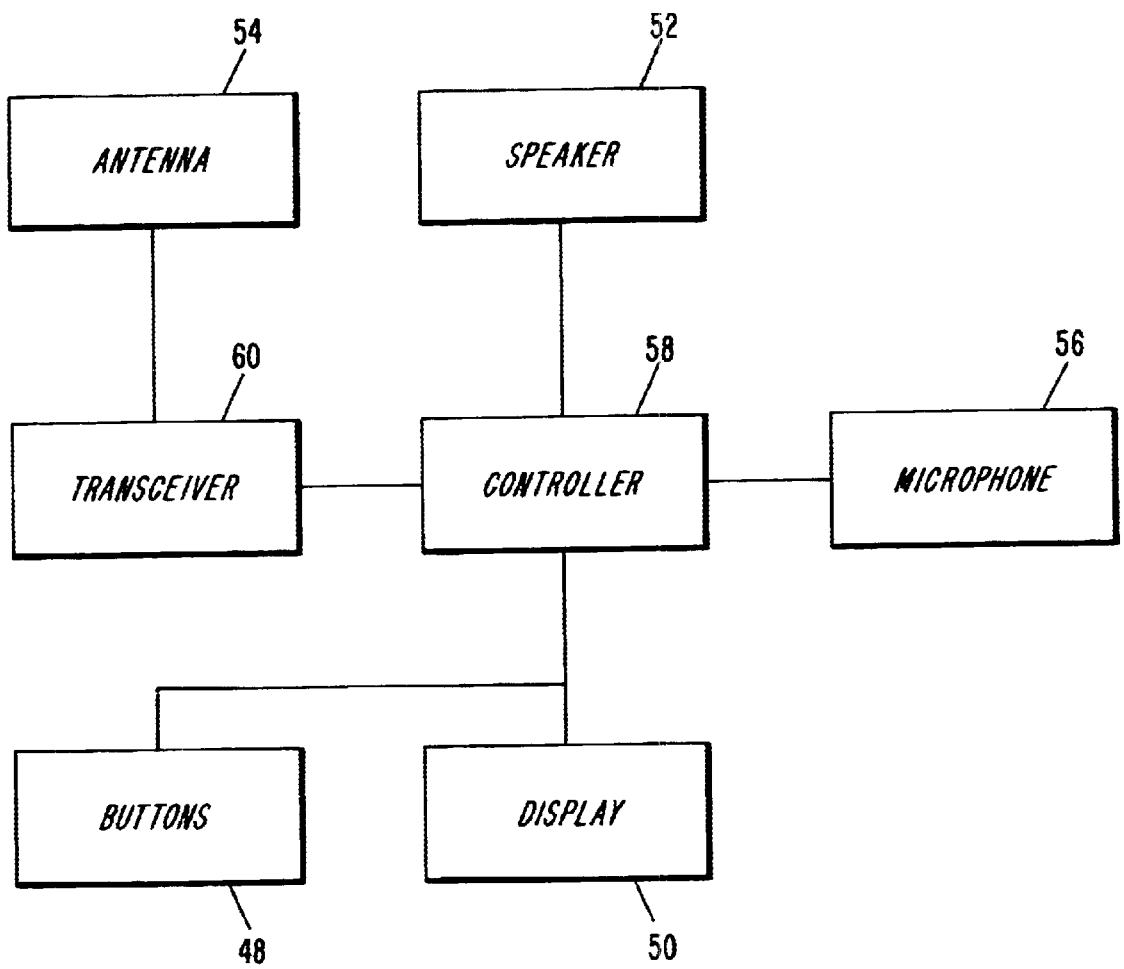
FIG. 2 is a block diagram representation of some of the functional components associated with the mobile terminal of FIG. 1.

According to an exemplary embodiment of the present invention, it is desirable to provide a mechanism for permitting the mobile terminal to recognize that the flip portion 22 of the housing has been moved into (or from) its operative or on-hook position as will now be discussed with respect to FIGS. 1–3. This exemplary embodiment of the present invention provides a switching mechanism 70 to the microphone bias circuit 72, which switching mechanism 70 is mechanically (or otherwise) connected to flip portion 22 of the mobile terminal 20. When the flip cover 22 is closed, the switching mechanism 76 is opened. This is the normal position for the switching position, i.e., when the mobile terminal 20 is in standby mode. Since the flip cover 22 is closed, the microphone 56 is not biased and this condition can be sensed by controller 58 as described below.

If the user opens the flip cover 22, and thus closes the switching mechanism 70, e.g., due to an incoming call, the microphone 56 will be biased by the +Vcc supply. Current will then flow through the resistors R1, R2 and through the microphone 56. There are at least two ways for the controller 58 to sense whether the flip cover 22 is opened or not based on the condition of the microphone bias circuit 72. First, the current provided by the +Vcc supply can be measured using well known techniques. If, for example, the current through the microphone 56 is about 0.5 mA, the presence or absence of this current due to the position of the switching mechanism 70 can easily be detected. Alternatively, the voltage drop across resistor R1 which occurs when microphone 56 is added to the load of the circuit by the closing of switching mechanism 70 can also be detected.

In an exemplary embodiment of the present invention, switching mechanism 70 includes one switch corresponding to each resistor R1, R2. In another exemplary embodiment of the present invention, switching mechanism includes only one switch connected to either resistor R1 or resistor R2.

Several advantages are achieved by using the state of the microphone bias circuit to also sense the position of the flip cover 22. For example, the flip sensing means can be accomplished without adding any new components. To sense the voltage drop across the resistor R1, an A/D converter, voltage comparator, voltage detector etc., can be used, which devices are already employed in other circuits within the mobile terminal 20 and, therefore, a spare input of one of these devices can be used. Likewise, if current sensing is employed instead to detect changes in the microphone bias circuit, such current sensing can be performed using current sensing devices already present in the mobile terminal 20 for other purposes. No external components are needed since the function can be fully integrated in the same chip that provides the +Vcc supply for microphone bias. Moreover, no magnet is needed which makes it easier to design the mobile phone as a smaller, less costly unit than would be the case if a Hall-type sensor was used to detect the flip cover's position.

The connection of the microphone 56 to the rest of the mobile terminal's circuitry is preferably provided in a way that allows the flip cover 22 to be removed and replaced. The connection can, for example, be made as a sliding contact. This contact can be designed in a fashion that connects/disconnects the microphone when the flip cover is operated and, at the same time, a flip position sensing mechanism is provided.

Another application for current or voltage detection of the microphone bias according to the present invention occurs if an external microphone is connected to the mobile terminal 20 (e.g., a portable hands-free device), since the connection of such a devices will also change the bias current. Thus, connection of the portable hands-free device may then be sensed by the methods described above.

Moreover, when a mobile terminal 20 is used together with a portable, handsfree device, another very desirable feature for users is to provide the on-hook/off-hook button directly on the portable device, rather than on the mobile terminal. When using a portable, hands-free device, the mobile terminal itself may be placed in the user's pocket, i.e., requiring the user to retrieve his or her phone from a pocket to activate or deactivate the terminal. If the button which activates the hook on/off function is placed on the portable, hands-free equipment instead, e.g., on the cord between the terminal and portable hands-free device, this will avoid this difficulty. According to another exemplary embodiment of the invention, illustrated in FIG. 4, this can be accomplished without adding any extra signals in the cord 82 (illustrated schematically as including three signal lines) between the terminal 20 and the portable, hands-free device 80.

Figure 3:
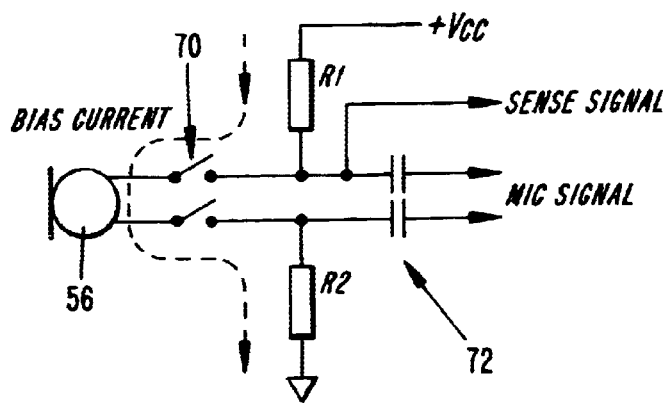
FIG. 3 shows a microphone bias circuit/flip portion sensing circuit according to an exemplary embodiment of the present invention.

As in the embodiment of FIG. 3, implementing an on-hook/off-hook button according to this exemplary embodiment can also be accomplished in conjunction with the microphone bias circuit. In this particular case, however, the microphone 56 (and speaker 52) are disposed in the portable, hands-free device 80 rather than in the mobile terminal 20.

Figure 4:
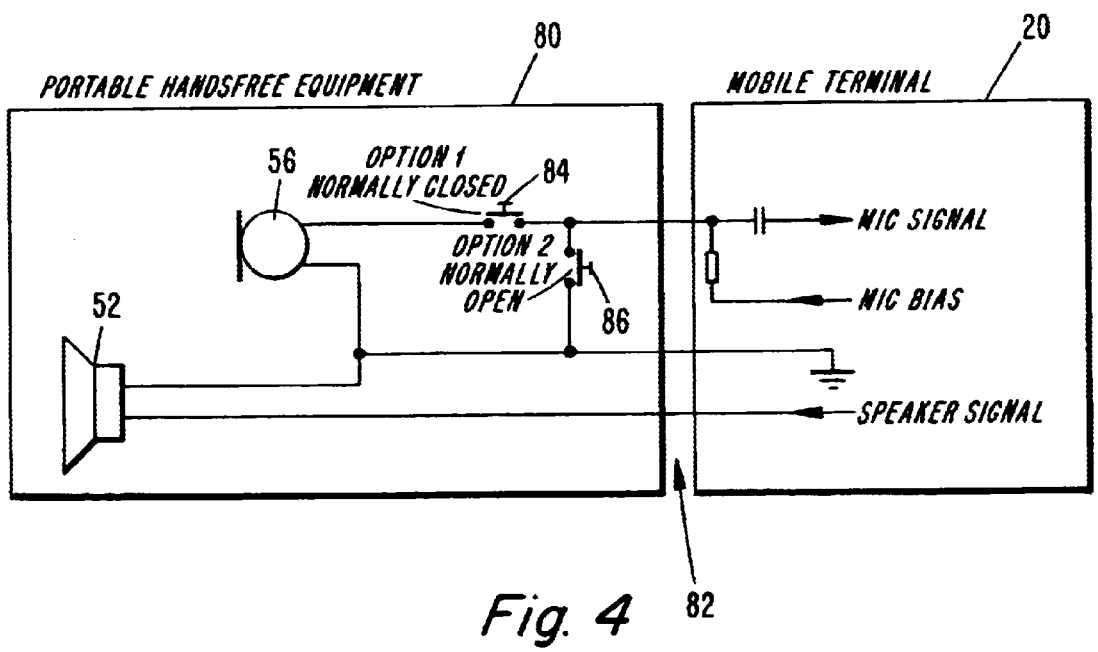
FIG. 4 depicts an exemplary on-hook/off-hook connection in a portable handsfree device according to another exemplary embodiment of the present invention.

If the microphone 56 is in use, a bias current of approximately 0.5 mA flows through the microphone 56, as earlier described. Using the hook on/off button (not shown) located, for example, on the cord 82 between the mobile terminal and the portable hands-free device, a switch 84 can be opened, thereby turning the microphone 56 off and reducing the bias current to zero. The change in current can be measured, e.g., as described above, indicating either an on-hook or off-hook condition. The switch can also be implemented in a way that shorts the bias to ground, as depicted in FIG. 4 by switch 86. In this latter case, the microphone bias current will increase to its maximum level, which can also be sensed to render an off-hook condition. It is also possible to provide the portable, hands-free device 80 with both switches 84 and 86 implemented. The switches can then indicate two different functions with, for example the switch 86 overriding switch 84. In any implementation, this functionality can be provided without adding another signal line between the portable hands-free device 80 and mobile terminal 20.

Figure 5:
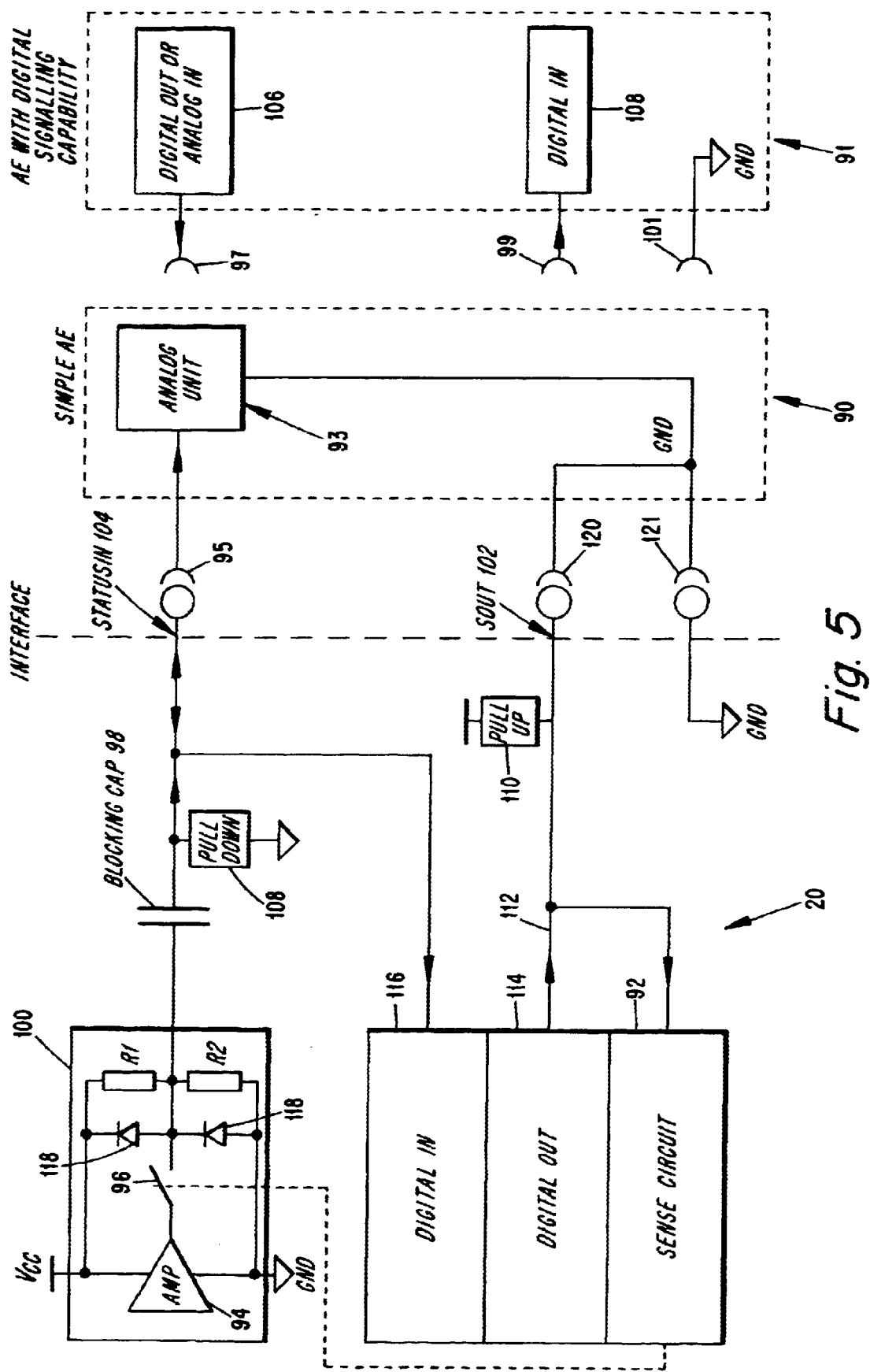
FIG. 5 shows an interface between a mobile terminal and various accessory devices wherein several signal pins can carry either digital or analog signals according to yet another exemplary embodiment of the present invention.

According to yet another exemplary embodiment of the present invention, an interface between the mobile terminal 20 and any attached accessory or auxiliary device can be made more flexible by allowing either analog or digital devices to be connected thereto with a minimum number of signaling pins required. This exemplary embodiment is illustrated in FIG. 5 and will now be described.

Therein, the mobile terminal 20 is connectable to an accessory equipment (AE) 90 through an interface (represented by the dotted line and signal lines passing therethrough). The accessory device may operate using analog signaling, digital signaling or may operate using either (i.e., be switchable between analog and digital signaling).

An exemplary analog AE 90 includes an analog unit 93 connected to a first port 95. The analog unit 93 is also connected to a second 120 and third 121 port which are both connected to ground. When the analog AE 90 is coupled to the mobile terminal 20, the first port 95 is coupled to a StatusIn port 104 of the mobile terminal 20. The second port 120 is coupled to an interface port (SOUT) 102 and the third port 121 is coupled to a ground port of the mobile terminal 20.

An exemplary digital or analog/digital AE 91 includes a unit 106 which can receive analog signals in and/or send digital signals out of a first port 97. A unit 108 which receives digital signals is connected to second port 99 and a third port 101 is connected to ground. When the digital or analog/digital AE 91 is coupled to the mobile terminal 20, the first port 97 is coupled to the StatusIn port 104 of the mobile terminal 20. The second port 99 is coupled to the interface port (SOUT) 102 and the third port 101 is coupled to the ground port of the mobile terminal 20.

An interface port (SOUT) 102 is normally used as a serial bus-output for the mobile terminal 20. For the purposes of this exemplary embodiment, this port is also used to detect whether an analog or digital device is connected thereto. When a digital AE 91 is connected thereto, port 99 is connected to SOUT 102 and the logical level of the SOUT port 102 will vary over time. However, when an analog AE is connected thereto, port 120 is connected to SOUT 102 and this port will be held to ground since port 121 and port 120 are both connected to ground. Thus, the logical state (high or low) of port SOUT 102 can be monitored by electronic circuitry to determine the accessory type. If the sense circuit 92 detects a logical low signal on port SOUT 102 for a time longer than the longest possible time that the serial output is ever low during digital signaling, then the sense circuit 92 recognizes the accessory equipment 90 as using analog signaling. Those skilled in the art will understand that the threshold used by sense circuit 92 to establish the type of accessory equipment is a function of the word format and baud rate of typical accessories but is premised on the notion that a digital device will not be sent an infinite string of logical low values.

The sense circuit 92 then changes the function of another port in the interface, the StatusIn port 104, to provide analog output signals from the mobile terminal 20. This is accomplished by switching amplifier 94 into the circuit using switch 96. The StatusIn signal provided to the StatusIn port 104 is, in its default state with the amplifier 94 switched out of the circuit, a digital status signal or a hardware handshake signal input which is fed to a digital in port 116.

When an analog AE 90 is detected, the function of the StatusIn port 104 is changed to analog operation by switching the amplifier back into the circuit. The analog output signal is connected to the StatusIn port 104 via a DC blocking capacitor 98, which prevents propagation of digital signals into the analog circuitry 100 during digital operation. In addition, diodes 118 assist in preventing a digital signal from being fed back to Vcc and ground. By making the audio signal source have a high impedance (using resistors R1 and R2) and by muting the audio signal during the default digital signaling function (using the switch 96), it is ensured that the audio signal source and the DC blocking capacitor do not degrade the digital signaling. A pull-down resistor 108 provides a logic low when no accessory equipment is attached and, thus, digital input to the digital input port 116 is not triggered inadvertently. A pull-up resistor 110 in the digital output signal line 112 provides a logical high value at the digital output port 114 and the input port of the sense circuit 92 when no accessory equipment is attached, but is pulled low when an analog AE 90 is attached to the SOUT port 102.

While other digital signal levels are determined by the supply voltage, VCC, the logical high and low voltage levels on the StatusIn port 104 are defined by VCC/2 volts. VCC/2 is also the bias voltage at the analog signal source output. This prevents the digital signal from being fed to power and ground via the ubiquitous protective diodes at the pins of integrated circuits. For example, if a digital circuit is powered by 3 V, then the maximum high signal would be slightly less than 3 V for a normal digital signal, but the StatusIn signal maximum level is half, i.e., 1.5 V.

This exemplary embodiment provides a means for reducing the number of electrical connection pins in a system interface bus, and avoiding the need for electronic components such as microcontrollers or logic circuits on one side of the interface. The solution enables interconnection of equipment with a varying degree of complexity to the same interface with fewer pins in the interface connector than would be otherwise needed.

Although the invention has been described in detail with reference only to a few exemplary embodiments, those skilled in the art will appreciate that various modifications can be made without departing from the invention. Accordingly, the invention is defined only by the following claims which are intended to embrace all equivalents thereof.

What is claimed is:

1. An interface between a mobile terminal and an accessory equipment comprising:

a sensory device connected to an output port of said mobile terminal for monitoring a logic level of said output port; and means for switching an input port of said interface from a digital configuration to an analog configuration in response to said monitored logic level remaining at a substantially constant value for a predetermined time threshold.

2. The interface of claim 1, wherein said constant value is a logical low level.

3. The interface of claim 1, wherein said interface comprises:

a first port coupled to an analog output circuit; and a second port coupled to a digital output circuit and said sensory device.

4. The interface of claim 3, wherein an analog device is coupled to said first and second port during said analog configuration and wherein a digital device is coupled to said first and second port during said digital configuration.

5. A method for switching an electronic device from a digital mode to an analog mode comprising:

monitoring a logic level of an output port of said electronic device;

switching an input port of an interface of said electronic device from a digital configuration to an analog configuration in response to said monitored logic level remaining at a substantially constant value for a predetermined time threshold.

6. The method of claim 5, wherein said constant value is a logical low level.

7. The method of claim 5, wherein said monitoring is performed by a sensory device, wherein said interface comprises a first port coupled to an analog output circuit and a second port coupled to a digital output circuit and said sensory device, and wherein said monitored logic level remains at a substantially constant value for a predetermined time threshold in response to a coupling of an analog device to said first and second port during said analog configuration.

8. The method of claim 7, wherein said monitored logic level does not remain at said substantially constant value for said predetermined time threshold when a digital device is coupled to said first and second port.

9. An interface between a mobile terminal and an accessory equipment comprising:

a sensory device connected to an output port of said mobile terminal for monitoring a logic level of said output port; and means for switching an input port of said interface from a digital configuration to an analog configuration in response to said monitored logic level remaining at a substantially constant value for a time exceeding a maximum logic time duration for said digital configuration.

10. A method for switching an electronic device from a digital mode to an analog mode comprising:

monitoring a logic level of an output port of said electronic device; and switching an input port of an interface of said electronic device from a digital configuration to an analog configuration in response to said monitored logic level remaining at a substantially constant value for a time exceeding a maximum logic time duration for said digital configuration.

* * * * *